United States Patent Office 3,238,211
Patented Mar. 1, 1966

3,238,211
DERIVATIVES OF 6-METHYL AND 1,6-DIMETHYL-
ERGOLINE I
Bruno Camerino, Bianca Patelli, and Alfredo Glaesser,
Milan, Italy, assignors to Societa Farmaceutici Italia,
Milan, Italy, a corporation of Italy
No Drawing. Filed July 27, 1964, Ser. No. 385,506
Claims priority, application Italy, May 29, 1961,
13,488/61; July 26, 1963, 15,700/63
15 Claims. (Cl. 260—285.5)

This is a continuation-in-part of application Serial No. 190,229, filed April 26, 1962, and relates to a new class of 6-methyl and 1,6-dimethyl-ergoline I derivatives and to 1-methyl-N-carbobenzoxy-dihydro-lysergamine I and their therapeutically useful acid addition salts.

Our invention has as an object the new compounds, D-6-methyl and 1,6-dimethyl-8-aminomethyl-ergoline I and the N-acyl derivatives thereof having the following structural formula:

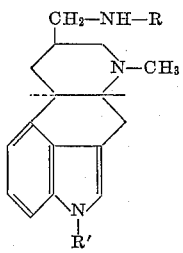

wherein R is hydrogen or a radical of an organic carboxylic or sulphonic acid of the group of aliphatic, cycloaliphatic, aromatic and heterocyclic acids, having from 1 to 10 carbon atoms substituted or not by halogen, by free or monoalkylated or dialkylated amino-groups, by nitro-, hydroxy-, alkyl-, alkoxy-, thioether- and sulfonic groups, and R' is either H or $CH_3$.

The invention includes pharmacological compositions containing the new compounds, are process for the preparation of said compounds.

Our invention has as another object products representing a further contribution to the research of new substances of the 6-methyl-ergoline class, having therapeutic action. The compounds of our invention have a high oxytocic, antienteraminic, adrenolytic, hypotensive and sedative activity, both in vitro and in vivo, and a very low toxicity.

As is well known in the literature (Manske, The Alkaloids, VII, 1960), the symbol "I" impliedly follows the name of new ergoline derivatives of the present invention and indicates that the hydrogen in the 10-position has the α-configuration. The starting materials for our invention are dihydro-D-lysergamide I (Stoll and Hofmann, Helv. Chim. Acta, 29, 1946, page 635) and 1-methyl-dihydro-D-lysergamide I (Troxler and Hofmann, Helv. Chim. Acta, 40, 1957, p. 1721). They are reduced to dihydro-D-lysergamine I and to 1-methyl-dihydro-D-lysergamine I respectively, and subsequently acylated to give amide derivatives.

The reduction of dihydro-D-lysergamide I and 1-methyl-dihydro-D-lysergamide I is carried out by any reducing agent which is capable of reducing the amide group into an amine group, preferably lithium aluminum hydride. The reaction may be carried out at room temperature but is preferably completed in the warm; it is carried out in the presence of a solvent, inert towards reducing agents, such as an ether, such as ethyl ether, propyl ether, tetrahydrofuran, and ethylene glycol dimethyl ether. Dihydro-D-lysergamine I and 1-methyl-dihydro-D-lysergamine I respectively are isolated as such in crystalline form by concentrating the reaction mixture and subsequent cooling. The corresponding N-acyl derivatives are prepared by reacting the dihydro-D-lysergamine I with an acylating agent such as the anhydride or the chloride of an appropriate organic carboxylic or sulfonic acid; from the group of aliphatic, cycloaliphatic, aromatic and heterocyclic acids having from 1 to 10 carbon atoms, which may be substituted by halogen, free, monoalkylated or dialkylated amino-groups, nitro-, hydroxy-, alkyl-, alkoxy-, thioether- and sulfonic-groups; in the optional presence of a tertiary amine, such as pyridine, diethylaniline, triethylamine.

Typical examples of acyl derivatives, prepared according to the present invention, are the derivatives of the following acids: acetic, trimethylacetic, propionic, butyric, valerianic, hexanoic, heptanoic, octanoic, decanoic, cyclopentanecarboxylic, cyclopentylpropionic, succinic, benzoic, 2-nitro-benzoic, 3-chloro-benzoic, salicylic, toluic, 2-methoxy-benzoic, methylthiosalicylic, 2,6-dimethoxy-benzoic, 3,4,5-trimethoxy-benzoic, phenylpropionic, phenoxy-acetic, α - phenoxypropionic, diethylcarbamic, chloroacetic, N,N-diethyl-aminoacetic, trimethyl-acetic, α-phenoxy-butyric, butyl carbonic, isobutyl carbonic, ethyl carbonic, propyl carbonic, isopropyl carbonic, N-ethyl-anthranilic, N,N-dimethylanthranilic, p-toluenesulfonic, methanesulfonic, pyrrole-2-carboxylic, N-pyrrolidine-acetic, nicotinic, isonicotinic, pyridine-3,5-dicarboxylic, pyridine-3-sulfonic, lutidinic, pyridine-3-acetic picolinic, pyridine-3-isobutyric, piperidne-2-carboxylic, 3-ethyl-piperidine-4-acetic, indole-3-acetic, imidazole-4-acetic, pyrazinoic, piperazine-1-acetic, piperazine-2-dimethylaminoethyl-1-carboxylic, pyrimidine-4-carboxylic, pyrimidine-5-bromo-2-carboxylic, pyrimidine-5-amino-2-methyl-4-carboxylic, furan-3-methyl-2-carboxylic, furan-2-carboxylic, pyran-2,6-dicarboxylic, thiophene-3-carboxylic, thiophene-2,4-disulfonic, isooxazole-3-carboxylic, isooxazole-5-amino-3-methyl - 4 - carboxylic, N-morpholino-acetic, thiomorpholine-3,5-dicarboxylic, thiazole-2-carboxylic, thiazole-4-methyl-2-carboxylic, thiazole-2-amino-4-carboxylic, thiazole-2-hydroxy-4-carboxylic and thiazole-2-acetic.

The products of our invention are crystalline, colorless or yellow solids, soluble in the usual organic solvents and in acids. The compounds of the present invention show a remarkable high oxytocic, antienteraminic, adrenolytic, hypotensive and sedative activity, and a lower toxicity (up to 10 times less than analogous products already known). In human therapy, they can be administered orally, intramuscularly, and subcutaneously as well as intraveneously. They are particularly used in internal medicine (migraine, cephalea, nervous tachycardia, atony of the stomach, hyperthyroidism, Basedow disease, trigeminal neuralgia, peripheral vascular diseases) and in obstetrics and gynecology (metrorrhagia, puerperium, curettage, abortion, pregnancy toxemia, uterine atony). The compounds have also proved valuable as sedative of the central nervous system. The clinical doses for humans range from 0.1 to 5 mg. per day of active compound according to the case.

The therapeutic compositions as usually employed include one or more compounds of the present invention with a certain amount of solid or liquid vehicle. The compositions can be prepared as tablets, powders, pills and other forms suitable for oral administration. The liquid diluents, properly sterilized, are employed for parenteral administration. Some excipients can be employed, among which the most suitable are: starch, lactose, talc, magnesium stearate.

The following examples serve to illustrate, but not to limit, the present invention.

Example 1.—Dihydro-D-lysergamine I 1 g. of dihydro-D-lysergic acid amide was dissolved in 160 cc. of anhydrous tetrahydrofuran and was reacted, at room temperature, with about 1 g. of lithium aluminum hydride. The reaction mixture was kept at room temperature for an hour, then it was refluxed for an hour and a half and then about ⅔ of the solvent were distilled. It was cooled with ice and the excess reagent was removed very slowly by adding ice and chloroform. Chloroform was added and the mixture was filtered, and the filter was washed thoroughly with chlorofrm. The chloroform solution was washed three times with water and then it was distilled in vacuo. The crystalline residue was taken up with ether and filtered. 0.700 g. of dihydro-D-lysergamine I, melting at 204°–207° C. was obtained.

Example 2.—N-acetyl-dihydro-D-lysergamine I 0.800 g. of dihydro-D-lysergamine I in 5 cc. of pyridine were cooled to −10° C. and were reacted with 0.3 cc. of acetyl-chloride. The reaction mixture was kept at this temperature for 10 minutes and then for 10 minutes at room temperature. It was diluted with chloroform and methanol and 5% aqueous sodium bicarbonate were added till dissolution was complete. The chloroform layer was separated and the mother liquors were extracted twice again with chloroform. The extracts were collected, washed with water and dried. After distillation of the solvent and recrystallization from acetone-petroleum ether, 0.700 g. of N-acetyl-dihydro-D-lysergamine I, melting at 150–152° C., was obtained.

Example 3.—N-proprionyl-dihydro-D-lysergamine I

The preparation was carried out in the same way as in Example 2 by reacting 0.300 g. of dihydro-D-lysergamine I dissolved in 2 cc. of pyridine with 0.3 cc. of propionic anhydride, and the reaction mixture was kept at room temperature for an hour. 0.280 g. of N-propionyl-dihydro-D-lysergamine I melting at 193–195° C. was obtained.

Example 4.—N-decanoyl-dihydro-D-lysergamine I

The preparation was carried out in the same way as in Example 2 by reacting a solution of 0.300 g. of dihydro-D-lysergamine I in 2 cc. of pyridine with 0.3 cc. of decanoic acid chloride. By recrystallization from ethyl ether-petroleum ether, 0.300 g. of N-decanoyl-dihydro-D-lysergamine I melting at 88–90° C. was obtained.

Example 5.—N-isobutyryl-dihydro-D-lysergamine I

The preparation was carried out in the same way as in Example 2 by reacting 0.300 g. of dihydro-D-lysergamine I in 2 cc. of pyridine with 0.3 cc. of isobutyryl chloride and subsequent recrystallization from petroleum ether acetone to yield 0.250 g. of N-isobutyryl-dihydro-D-lysergamine I melting at 225°–228° C.

Example 6.—N-cyclopentyl-propionyl-dihydro-D-lysergamine I

The preparation was carried out in the same way as in Example 2, by reacting 0.300 g. of dihydro-D-lysergamine I in 2 cc. of pyridine with 0.3 cc. of cyclopentyl-propionyl-chloride, and by recrystallization from acetone-petroleum ether, to obtain 0.300 g. of N-cyclopentyl-proprionyl-dihydro-D-lysergamine I melting at 150–152° C.

Example 7.—N-succinyl-dihydro-D-lysergamine I 0.300 g. of dihydro-D-lysergamine I dissolved in 2 cc. of pyridine were added to 0.300 g. of succinic anhydride and kept at room temperature for an hour. After addition of chloroform and water, the residual suspension was filtered. It was dissolved in dilute ammonia, decolorized with carbon and, after filtration, was concentrated in vacuo. The obtained precipitate was filtered and washed with water to yield 0.320 g. of N-succinyl-dihydro-D-lysergamine I melting at 255–258° C. The product crystallized with a molecule of water.

Example 8.—N-benzoyl-dihydro-D-lysergamine I

The preparation was carried out in the same way as in Example 2, by reacting 0.270 g. of dihydro-D-lysergamine I with 0.130 cc. of benzoyl chloride dissolved in 2 cc. of pyridine, and by recrystallization from acetone, to yield 0.180 g. of N-benzoyl-dihydro-D-lysergamine I melting at 196–198° C.

Example 9.—N-phenyl-proprionyl-dihydro-D-lysergamine I

The preparation was carried out in the same way as in Example 2, by reacting 0.300 g. of dihydro-D-lysergamine I with 0.3 cc. of phenyl-propionyl chloride in 2 cc. of pyridine, and by recrystallization from acetone-petroleum ether to obtain 0.400 g. of N-phenyl-propionyl-dihyro-D-lysergamine I melting at 103–105° C.

Example 10.—N-phenoxy-acetyl-dihydro-D-lysergamine I

The preparation was carried out in the same way as in Example 2, by reacting 0.300 g. of dihydro-D-lysergamine I with 0.3 cc. of phenoxy-acetyl-chloride in 2 cc. of pyridine, and by recrystallization from acetone-petroleum ether to yield 0.350 g. of N-phenoxy-acetyl-dihydro-D-lysergamine I melting at 110–112° C.

Example 11.—N-α-phenoxy-propionyl-dihydro-D-lysergamine I

The preparation was carried out in the same way as in Example 2, by reacting 0.300 g. of dihydro-D-lysergamine I with 0.3 cc. of α-phenoxy-propionyl chloride in 2 cc. of pyridine, and by recrystallization from acetone-petroleum ether, 0.420 g. of N-α-phenoxy-propionyl-dihydro-D-lysergamine I melting at 100–102° C. was obtained.

Example 12.—N-2,6-dimethoxy-benzoyl-dihydro-D-lysergamine I

The preparation was carried out in the same way as in Example 2; by reacting 0.300 g. of dihydro-D-lysergamine I with 0.300 g. of 2,6-dimethoxy-benzoyl-chloride in 2 cc. of pyridine and by recrystallization from acetone-petroleum ether, 0.400 g. of N-2,6-dimethoxy-benzoyl-dihydro-D-lysergamine I melting at 243–245° C. were obtained.

Example 13.—N-3,4,5-trimethoxy-benzoyl-dihydro D-lysergamine I

The preparation was carried out in the same way as in Example 2; by reacting 0.300 g. of dihydro-D-lysergamine I with 0.300 g. of 3,4,5-trimethoxy-benzoyl-chloride in 2 cc. of pyridine and by recrystallization from acetone, 0.230 g. of N-3,4,5-trimethoxy-benzoyl-dihydro-D-lysergamine I melting at 228–230° C. were obtained.

Example 14.—N-diethyl-carbamyl-dihydro-D-lysergamine I

The preparation was carried out in the same way as in Example 2; by employing a normal solution of sodium hydroxide instead of sodium bicarbonate and by reacting 0.300 g. of dihydro-D-lysergamine I with 0.300 cc. of diethyl-carbamyl chloride, in 2 cc. of pyridine, and by recrystallization from acetone-petroleum ether, 0.150 g. of N-diethyl-carbamyl-dihydro-D-lysergamine I melting at 150–152° C. were obtained.

Example 15.—N-carbethoxy-dihydro-D-lysergamine I

The preparation was carried out in the same way as in Example 2, by reacting a solution of 0.500 g. of dihydro-D-lysergamine I with 0.500 cc. of ethyl chlorocarbonate dissolved in 3 cc. of pyridine. By recrystallization from acetone-petroluem ether, 0.450 g. of N-carbethoxy-dihydro-D-lysergamine I, melting at 188–190° C., were obtained.

*Example 16.—N-trimethyl-acetyl-dihydro-D-lysergamine I*

The preparation was carried out in the same way as in Example 2, by reacting a solution of 0.500 g. of dihydro-D-lysergamine I with 0.400 cc. of trimethyl-acetyl chloride dissolved in 3 cc. of pyridine. By recrystallization from acetone-petroleum ether, 0.500 g. of N-trimethyl-acetyl-dihydro-D-lysergamine I melting at 190–192° C. were obtained.

*Example 17.—DL,N-α-phenoxy-butyryl-dihydro-D-lysergamine I*

The preparation was carried out in the same way as in Example 2, by reacting a solution of 0.500 g. of dihydro-D-lysergamine I with 0.400 cc. of DL,α-phenoxy-butyryl-chloride dissolved in 3 cc. of pyridine. By recrystallization from acetone-petroleum ether, 0.550 g. of DL,N-α-phenoxy-butyryl-dihydro-D-lysergamine I melting at 88–90° C. was obtained.

*Example 18.—N-isopropyl-carboxy-dihydro-D-lysergamine I*

The preparation was carried out in the same way as in Example 2, by reacting a solution of 0.500 g. of dihydro-D-lysergamine I with 0.400 g. of isopropyl-chlorocarbonate dissolved in 3 cc. of pyridine. By recrystallization from acetone-petroleum ether, 0.450 g. of N-isopropyl-carboxy-dihydro-D-lysergamine I melting at 110–112° C. was obtained.

*Example 19.—N-propyl-carboxy-dihydro-D-lysergamine I*

The preparation was carried out in the same way as in Example 2, by reacting a solution of 0.500 g. of dihydro-D-lysergamine I with 0.400 g. of propyl-chlorocarbonate dissolved in 33 cc. of pyridine. By recrystallization from acetone-petroleum ether, 0.500 g. of N-propyl-carboxy-dihydro-D-lysergamine I melting at 178–180° C. was obtained.

*Example 20.—N-butyl-carboxy-dihydro-D-lysergamine I*

The preparation was carried out in the same way as in Example 2, by reacting a solution of 0.500 g. of dihydro-D-lysergamine I and 0.400 g. of butyl-chlorocarbonate dissolved in 3 cc. of pyridine. By recrystallization from acetone-petroleum ether, 0.510 g. of N-butyl-carboxy-dihydro-D-lysergamine I melting at 128–130° C. was obtained.

*Example 21.—N-isobutyl-carboxy-dihydro-D-lysergamine I*

The preparation was carried out in the same way as in Example 2, by reacting a solution of 0.500 g. of dihydro-D-lysergamine I with 0.400 g. of isobutyl-chlorocarbonate dissolved in 3 cc. of pyridine. By recrystallization from acetone-petroleum ether, 0.480 g. of N-isobutyl-carboxy-dihydro-D-lysergamine I melting at 138–140° C. was obtained.

*Example 22.—1-methyl-dihydro-D-lysergamine I*

2 g. of 1-methyl-dihydro-D-lysergamide I was dissolved in 300 cc. of anhydrous tetrahydrofuran and reacted at room temperature with about 2 g. of lithium aluminum hydride. The reaction mixture was kept at room temperature for an hour; it was then refluxed for an hour and a half and thereafter about ⅔ of the solvent was distilled off. The reaction mixture was cooled with ice and the excess reagent was removed very slowly with addition of ice. The mixture was taken up with chloroform. The chloroform solution was washed three times with water and then distilled in vacuo. The crystalline residue was taken up with ether and filtered. 1.4 g. of 1-methyl-dihydro-D-lysergamine I, melting at 145–147° C., was obtained.

*Example 23.—N-acetyl-1-methyl-dihydro-D-lysergamine I*

0.300 g. of 1-methyl-dihydro-D-lysergamine I dissolved in 2 cc. of pyridine was cooled to −10° C. and reacted with 0.2 cc. of acetyl chloride. The reaction mixture was kept at this temperature for 10 minutes, then at room temperature for 10 minutes. It was diluted with chloroform and 5% aqueous sodium bicarbonate was added until dissolution was complete. The chloroform layer was separated and the mother liquors were extracted twice again with chloroform. The extracts were collected, washed with water and dried over anhydrous sodium sulphate. After solvent distillation and recrystallization from acetone petroleum-ether, 0.300 g. of N-acetyl-1-dihydro-D-lysergamine I, melting at 203–205° C., was obtained.

*Example 24.—N-propionyl-1-methyl-dihydro-D-lysergamine I*

By operating as in Example 23, from 0.500 g. of methyl-dihydro-D-lysergamine I in 3 cc. of pyridine and 0.5 cc. of propionic anhydride, 0.400 g. of N-propionyl-1 - methyl - dihydro - D - lysergamine I, melting at 185–187° C., was obtained by recrystallization from acetone petroleum-ether.

*Example 25.—N-isobutyryl-1-methyl-dihydro-D-lysergamine I*

By operating as in Example 23, from 0.500 g. of 1-methyl-dihydro-D-lysergamine I and 0.5 cc. of isobutyryl-chloride in 3 cc. of pyridine and by recrystallization from acetone petroleum-ether, 0.400 g. of N-isobutyryl-1-methyl-dihydro-D-lysergamine I, melting at 140–142° C., was obtained.

*Example 26.—N-carbethoxy-1-methyl-dihydro-D-lysergamine I*

By operating as in Example 23, from 0.500 g. of 1-methyl-dihydro-D-lysergamine I and 0.4 cc. of ethyl chlorocarbonate in 3 cc. of pyridine, and by recrystallization from acetone petroleum-ether, 0.450 g. of N-carbethoxy-1-methyl-dihydro-D-lysergamine I, melting at 150–152° C., was obtained.

*Example 27.—DL-N-α-phenoxy-propionyl-1-methyl-dihydro-D-lysergamine I*

By operating as in Example 23, from 0.500 g. of 1-methyl-dihydro-D-lysergamine I and 0.5 cc. of DL,α-phenoxy-propionyl-chloride in 3 cc. of pyridine, and by recrystallization from acetone-petroleum ether, 0.450 g. of DL,N-α-phenoxy - propionyl - 1 - methyl - dihydro-D-lysergamine I, melting at 145–147° C., was obtained.

*Example 28.—N-benzoyl-1-methyl-dihydro-D-lysergamine I*

By operating as in Example 23, from 0.500 g. of 1-methyl-dihydro-D-lysergamine I and 0.4 cc. of benzoyl-chloride in 3 cc. of pyridine by recrystallization from acetone, 0.5 of N-benzoyl-1-methyl-dihydro-D-lysergamine I, melting at 220–222° C., was obtained.

*Example 29.—DL-N,α-phenoxy-butyryl-1-methyl-dihydro-D-lysergamine I*

By operating as in Example 23, from 0.500 g. of 1-methyl-D-lysergamine I and 0.4 cc. of DL,α-phenoxy-butyryl-chloride in 3 cc. of pyridine, and by recrystalization from acetone, 0.500 g. of DL-N,α-phenoxy-butyryl-1-methyl-dihydro-D-lysergamine I, melting at 188–190° C., was obtained.

Example 30.—N-phenoxy-acetyl-1-methyl-dihydro-D-lysergamine I

By operating as in Example 23, from 0.500 g. of 1-methyl-dihydro-D-lysergamine I and 0.4 cc. of phenoxyacetyl chloride in 3 cc. of pyridine, and by recrystallization from acetone petroleum-ether, 0.550 g. of N-phenoxyacetyl-1-methyl-dihydro-D-lysergamine I, melting at 168–170° C., was obtained.

Example 31.—N-isobutyl-carboxy-1-methyl-dihydro-D-lysergamine I

By operating as in Example 23, from 0.500 g. of 1-methyl-dihydro-D-lysergamine I and 0.500 g. of isobutylchlorocarbonate in 3 cc. of pyridine, and by recrystallization from acetone-petroleum ether 0.420 g. of N-isobutyl-carboxy-1-methyl-dihydro-D-lysergamine I, melting at 138–140° C. was obtained.

Example 32.—N-isopropyl-carboxy-1-methyl-dihydro-D-lysergamine I

By operating as in Example 23, from 0.500 g. of 1-methyl-dihydro-D-lysergamine I and 0.450 g. of isopropyl-chlorocarbonate in 3 cc. of pyridine, and by recrystallization from acetone-petroleum ether, 0.450 g. of N-isopropyl-carboxy-1-methyl-dihydro-D-lysergamine I melting at 193–195° C. was obtained.

Example 33.—N-n-butyl-carboxy-1-methyl-dihydro-D-lysergamine I

By operating as in Example 23, from 0.500 g. of 1-methyl-dihydro-D-lysergamine I and 0.500 g. of butylchlorocarbonate in 3 cc. of pyridine, and by recrystallization from acetone-petroleum ether, 0.480 g. of N-n-butyl-carboxy-1-methyl-dihydro-D-lysergamine I melting at 125–127° C. was obtained.

Example 34.—N-n-propyl-carboxy-1-methyl-dihydro-D-lysergamine I

By operating as in Example 23, from 0.500 g. of 1-methyl-dihydro-D-lysergamine I and 0.450 g. of propylchlorocarbonate in 3 cc. of pyridine, and by recrystallization from acetone-petroleum ether, 0.450 g. of N-n-propyl-carboxy-1-methyl-dihydro-D-lysergamine I melting at 128–130° C. was obtained.

Example 35.—N-chloroacetyl-1-methyl-dihydro-D-lysergamine I

To 1 g. of 1-methyl-dihydro-D-lysergamine I in 20 cc. of tetrahydrofuran, 1.42 g. of sodium acetate and cracked ice were added. The mixture was cooled with ice and kept under stirring for 30 minutes with 0.320 cc. of chloro-acetyl-chloride in 16 cc. of tetrahydrofuran. The mixture was then diluted with chloroform and made alkaline with 1% sodium hydroxide. The chloroform solution was then washed with water and the solvent was distilled off in vacuo. The residue, on recrystallization from acetone-petroleum ether, yields 0.900 g. of the product melting at 263–265° C.

Example 36.—N-diethylamino-acetyl-1-methyl-dihydro-D-lysergamine I 0.300 g. of 1-methyl-dihydro-D-lysergamine I was reacted with 0.3 g. of N,N-diethyl-amino-acetyl-chloride in 3 cc. of pyridine at −10° C. The reaction mixture was kept at this temperature for 10 minutes and then for 10 minutes at room temperature, whereon it was diluted with chloroform, poured into a separatory funnel and washed with an 1% aqueous solution of sodium hydroxide and thereafter with water. After solvent distillation in vacuo the residue was crystallized from acetone-petroleum ether. 0.18 g. of N-diethylamino-acetyl-1-methyl-dihydro-D-lysergamine I melting at 128–130° C. was obtained.

Example 37.—N-pyrazinoyl-dihydro-D-lysergamine I 0.500 g. of dihydro-D-lysergamine I in 3 cc. of pyridine was cooled to −10° C., reacted with 0.500 cc. of pyrazinoyl chloride. The reaction mixture was kept at this temperature for 10 minuutes and then for 10 minutes at room temperature, whereupon it was diluted with chloroform, poured into a separatory funnel and washed with an 1% aqueous solution of sodium hydroxide and thereafter with water. After solvent distillation in vacuo the residue was crystallized from acetone-petroleum ether. 0.450 g. of N-pyrazinoyl-dihydro-D-lysergamine I melting at 230–232° C. with decomposition was obtained.

Example 38.—N-nicotinyl-dihydro-D-lysergamine I

The preparation is carried out in the same way as in Example 37, by reacting 0.500 g. of dihydro-D-lysergamine I in 3 cc. of pyridine with 0.500 g. of nicotinylchloride-hydrochloride. By recrystallization from acetone, 0.450 g. of the product, melting at 188–190° C., was obtained.

Example 39.—N-nicotinyl-1-methyl-dihydro-D-lysergamine I

The preparation was carried out in the same way as in Example 37, by reacting 0.500 g. of 1-methyl-dihydro-D-lysergamine I in 3 cc. of pyridine with 0.500 g. of nicotinylchloride hydrochloride. On recrystallization from acetone-petroleum ether, 0.400 g. of the product, melting at 178–180° C., was obtained.

Example 40.—N-isonicotinyl-1-methyl-dihydro-D-lysergamine I

The preparation was carried out in the same way as in Example 37, by reacting 0.500 g. of 1-methyl-dihydro-D-lysergamine I in 3 cc. of pyridine with 0.500 g. of isonicotinyl chloride hydrochloride. On recrystallization from acetone-petroleum ether, 0.450 g. of the product, melting at 218–220° C., was obtained.

Example 41.—N-picolinyl-1-methyl-dihydro-D-lysergamine I

The preparation was carried out in the same way as in Example 37, by reacting 0.500 g. of 1-methyl-dihydro-D-lysergamine I in 3 cc. of pyridine with 0.500 g. of picolinyl chloride. On recrystallization from acetone-petroleum ether, 0.350 g. of the product, melting at 168–170° C., was obtained.

Example 42.—N-morpholino-acetyl-1-methyl-dihydro-D-lysergamine I

The preparation was carried out in the same way as in Example 37, by reacting 0.500 g. of 1-methyl-dihydro-D-lysergamine I in 3 cc. of pyridine with 0.500 g. of N-morpholino-acetyl chloride. On recrystallization from acetone, 0.380 g. of the product, melting at 163–165° C., was obtained.

Example 43.—N-pyrrolidino-acetyl-1-methyl-dihydro-D-lysergamine I

The preparation was carried out in the same way as in Example 37, by reacting 0.500 g. of 1-methyl-dihydro-D-lysergamine I in 3 cc. of pyridine with 0.500 g. of N-pyrrolidino-acetyl-chloride. On recrystallization from acetone-petroleum ether, 0.450 g. of the product, melting at 153–155° C., was obtained.

Example 44.—N-tosyl-dihydro-D-lysergamine I

The preparation is carried out in the same way as in Example 37, but reacting 0.500 g. of dihydro-D-lysergamine I with 0.500 g. of tosyl chloride in 3 cc. of pyridine. On recrystallization from acetone, 0.450 g. of N-tosyl-dihydro-D-lysergamine I, melting at 163–165° C., was obtained.

By the same procedure other N-acyl derivatives may be obtained, among which are: N-p. chloro-benzoyl-dihydro-D-lysergamine I (M.P. 138–140° C.), the N-p. chloro-benzoyl-1-methyl-dihydro-D-lysergamine I (M.P. 228–230° C.), the N-diethyl-acetyl-dihydro-D-lysergamine I (M.P. 180–182° C.), the N-cinnamoyl-dihydro-D-lysergamine I (M.P. 143–145° C.), the N-β-chloro-propionyl-1-methyl-dihydro-D-lysergamine I (M.P. 143–145° C.), the N-carbomethoxy-1-methyl-dihydro-D-lysergamine I (M.P. 80–82° C.), and the analogous products.

PHARMACOLOGY

In the following table the relative oxytocic activity values and toxicity of some new compounds of the present invention are reported in comparison with those of ergometrine stated equal to one.

TABLE

| Compounds | Relative oxytocic activity | Relative toxicity |
| --- | --- | --- |
| Ergometrine | 1 | 1 |
| N-acetyl-dihydro-D-lysergamine I | 1 | 0.1 |
| N-propionyl-dihydro-D-lysergamine I | 2 | 0.2 |
| N-isobutyryl-dihydro-D-lysergamine I | 2.5 | 0.5 |
| N-carbethoxy-1-methyl-dihydro-D-lysergamine I | 3 | 0.9 |

The oxytocic activity was determined according to the method described by Rothlin (Schweiz. Med. Wochenschrift, 1938, page 971) on rabbit uterus, in situ. After laparotomy, the uterus was connected by a yarn to a writing lever, the organ was wrapped up in cotton-wool soaked with physiological solution and kept warm by an infrared lamp. The toxicity was checked on rabbit and cat according to tests usually performed with drugs derived from lysergic acid by intravenously injecting the above-mentioned products.

Trials for checking the anti-5-hydroxy-tryptamine (5-HT) activity have been carried out "in vitro" according to the method described by V. Erspamer (Arch. exp. Path. Pharmark. 1940, 196, 343), which is based on the fact that the anti-5-HT compound antagonizes the contracting action of 5-HT on the rat uterus.

In vivo the anti-5-HT activity was checked by the method described by W. Doepfner and A. Cerletti (Int. Arch. Allergy, 12, pages 89–97, 1958) which is based on the inhibition of 50% of edema caused by 5-hydroxy-tryptamine on a rat's paw. Adrenolytic activity was tested in vitro on seminal vesicles of guinea pig and in vivo on the inhibition of adrenaline hypertension in the dog.

As an antienteraminic drug, the carbethoxy-1-methyl-dihydro-D-lysergamine I is three times more active than diethyl-D-lysergamide I in vitro and shows an adrenolytic activity comparable with that of ergotamine.

As an antienteraminic drug, the N-isopropylcarboxy-1-methyl-dihydro-D-lysergamine I is three times more active than diethyl-D-lysergamide I in vitro, and reduces the arterial pressure in the rabbit. As an adrenolytic drug, N-nicotinyl-1-methyl-dihydro-D-lysergamine I is 1.5 times more active than ergotamine tratrate and it reduces the arterial pressure in the rabbit.

The additional compounds have the following formula:

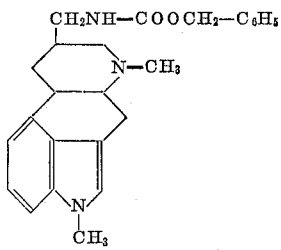

and both the free base itself and the non-toxic pharmaceutically acceptable salts, show a high biological activity, a delayed action and a low toxicity, making them particularly useful in the clinic as anticephalalgic, antiallergic and antiinflammatory drugs.

The starting material for the preparation of the new compounds of the invention is 1-methyl-dihydro-D-lysergamine I whose preparation is described in Example 22.

According to the process of the invention, 1-methyl-dihydro-lysergamine I, optionally dissolved in an inert solvent, such as aliphatic, aromatic either halogenated or not hydrocarbon, for example hexane, chloroform, trichloroethylene, benzene, toluene, xylene or an ether, for example, tetrahydrofuran or ethylene glycol dimethylether, is condensed with carbobenzoxychloride in the presence of a tertiary amine, such as pyridine, diethylaniline or trimethylamine.

Condensation is preferably carried out from $-15^{\circ}$ to $+50°$ C. and the reaction is completed at room temperature. When the reaction is over, a dilute aqueous alkaline solution, such as a 5–10% aqueous sodium or potassium hydroxide solution may be added until the solution shows an alkaline pH, and the resulting mixture extracted with a water immiscible solvent which may be one of those listed above.

The organic extract is evaporated and 1-methyl-N-carbobenzoxy-dihydro-lysergamine I is isolated from the residue by crystallization from an organic solvent or chromatography through alumina and further elution with an organic solvent.

This compound may be transformed by addition of an equivalent of acid, into its non-toxic pharmaceutically acceptable inorganic or organic acid addition salts, for example the hydrochloride, sulphate, phosphate, tartrat, maleate, citrate, ascorbate, succinate, salicylate and the others usually employed in therapy.

1-methyl-N-carbobenzoxy-dihydro-lysergamine I is a crystalline, colorless solid, stable both to light and warmth and soluble in organic solvents and acids.

In human therapy 1-methyl-N-carbobenzoxy-dihydro-lysergamine I or one of its salts may be administered either by the oral, rectal or parenteral route, finding particularly employment in the following clinical conditions: migraine, cephalalgy, trigeminal neuralgia, allergy in general and inflammatory states.

The therapeutic compositions as usually employed include 1-methyl-N-carbobenzoxy-dihydro-lysergamine I or one of its salts with a certain amount of solid or liquid vehicle. The therapeutic compositions can be prepared as tablets, powders, pills, elixir or other forms pharmaceutically suitable for oral administration. Liquid diluents, duly sterilized, may be employed for the parenteral administration. Some excipients may be employed, among which the most suitable are: starch, lactose, talc, magnesium stearate or other excipients usually employed in pharmacy. Tablets may be also prepared with substances normally employed for pharmaceutical use, or capsules and containers normally used, such as gelatin capsules.

The following example illustrates the additional features of this continuation-in-part:

*Example 45.—1-methyl-N-carbobenzoxy-dihydro-lysergamine I*

16 g. of 1-methyl-dihydro-lysergamine I are dissolved in 80 cc. of anhydrous pyridine by mildly heating. To the solution, cooled to $-10°$ C. and stirred, 18 cc. of 85% carbobenzoxychloride (in toluene) diluted in 36 cc. of chloroform are added dropwise, rather rapidly. The well stirred reaction mixture is kept at $-10°$ C. during the addition, and for 10 minutes afterwards. The cooling means is removed and the temperature is allowed to rise to room level in about 10 minutes. The reaction mixture is diluted with 240 cc. of chloroform and rapidly washed with 80 cc. of 5% aqueous sodium hydroxide solution, with saturated aqueous sodium bicarbonate solution, and finally with water. The chloroform solution is briefly dried over anhydrous sodium sulphate and evaporated to dryness in vacuo at 40° C. The oily residue is taken up in 160 cc. of benzene and passed through a column containing 48 g. of alumina. The column is then eluted with further 160 cc. of benzene. The collected eluates are evaporated in vacuo at 40° C. The thick oily residue is mixed with a small amount of anhydrous diethyl ether. After some time a crystalline mass is obtained, which is collected and washed with a small amount of benzene and diethyl ether. 12 g. of white crystals are obtained, melting at 146–148° C.; $[\alpha]_D^{28°} = -7° \pm 2°$.

Alternatively the product may be obtained directly by crystallization from benzene-diethyl rather than by chromatography.

PHARMACOLOGY 1-methyl-N-carbobenzoxy-dihydro-lysergamine I and its non-toxic pharmaceutically acceptable salts have a very low toxicity and a high biologic activity with such a delayed action as to make them useful as anticephalalgic, antiallergic and antiinflammatory drugs. This biologic activity is shown to be as antagonistic to the serotonine action and it has been tested both "in vitro" and "in vivo" and compared with that of the 1-methyl-lysergic acid butanolamide.

The antiserotonine activity has been determined "in vitro" according to the method described by Stone et al. (J. Pharm. Exp. Ther., 131, 1961, page 73) which is based on the inhibition of the contracting action of serotonine on the rat uterus.

The following Table 1 gives the results obtained of $EC_{50}$, that is the concentration (in $\gamma/cm.^3$), able to produce the inhibition of 50% of spasmogen effects caused by serotonine.

TABLE 1

| | 1-methyl-N-carbobenzoxy-dihydro-lyser-gamine I, $EC_{50}$ ($\gamma/cm.^3$) | 1-methyl-lysergic acid butanola-mide, $EC_{50}$ ($\gamma/cm.^3$) |
|---|---|---|
| Serotonine creatinine sulfate (0.005–0.01 $\gamma/cm.^3$) | 0.000001 | 0.0005 |

In vivo the antiserotonine activity was checked by the method described by W. Doepfner and A. Cerletti (Int. Arch. Allergy, 12, pages 89–97, 1958) which is based on the inhibition of 50% of edema caused by serotonine on a rat's paw.

Table 2 lists the results obtained of $ED_{50}$, that is the dose (in $\gamma/kg.$) able to produce the 50% of inhibition of the effects caused by serotonine.

TABLE 2

| | 1-methyl-N-carbobenzoxy-dihydro-lyser-gamine I, $ED_{50}$ ($\gamma/cm.^3$) (subcutaneously) | 1-methyl-lysergic acid butanola-mide, $ED_{50}$ ($\gamma/cm.^3$) (subcutaneously) |
|---|---|---|
| Serotonine creatinine sulfate (1 $\gamma/kg.$) | 15 | 16 |

The long lasting effect of 1-methyl-N-carbobenzoxy-dihydro-lysergamine I has been shown by the test of the guinea pig serotonine bronchospasm and it has been found that a subcutaneous administration of 15 $\gamma/kg.$ of 1-methyl-carbobenzoxy-dihydro-lysergamine I produces an inhibition of 50% of the bronchospastic effects caused by serotonine for a period of time of 24–48 hours. To obtain the same inhibition with 1-methyl-lysergic acid butanolamide, a more than 100 higher does has to be administered.

The toxicity of 1-methyl-N-carbobenzoxy-dihydro-lysergamine I was checked according to tests usually performed with drugs derived from lysergic acid. The following results were obtained:

| Animals | $DL_{50}$ (mg./kg.) |
|---|---|
| Mouse | 85 (intraperitoneally). |
| Mouse | 430 (orally). |
| Rabbit | 20 (intravenously). |
| Rat | 800 (orally). |

The above tests were performed on 20 animals per each test.

We claim:

1. A compound of the class of D-6-methyl and D-1,6-dimethyl-ergoline I of the formula:

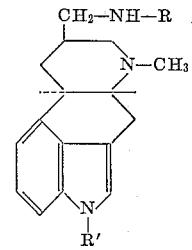

wherein R' is selected from the group consisting of hydrogen and methyl; R is an acyl group of an acid selected from the group consisting of
  (a) an unsubstituted saturated aliphatic acid of from 1 to 10 carbon atoms;
  (b) a substituted saturated aliphatic acid having from 2 to 4 carbon atoms, in which the substituent is selected from the group consisting of chloro, diethylamino and phenoxy;
  (c) an alkylcarbonic acid in which the alkyl group is from 1 to 4 carbon atoms;
  (d) benzylcarbonic acid;
  (e) diethylcarbamic acid;
  (f) cyclopentylpropionic acid;
  (g) an aromatic acid selected from the group consisting of phenylpropionic, cinnamic, substituted and unsubstituted benzoic acid in which the substituent is selected from the group consisting of chloro and methoxy;
  (h) a heterocyclic acid selected from the group consisting of nicotinic, isonicotinic, pyrazinoic, pyrrolidinoacetic and morpholinoacetic acid; and
  (i) toluenesulfonic acid.

2. N-acetyl-dihydro-D-lysergamine I.
3. N-propionyl-dihydro-D-lysergamine I.
4. N-isobutyryl-dihydro-D-lysergamine I.
5. N-carbethoxy-dihydro-D-lysergamine I.
6. N-butyl-carboxy-dihydro-D-lysergamine I.
7. N-acetyl-1-methyl-dihydro-D-lysergamine I.
8. N-propionyl-1-methyl-dihydro-D-lysergamine I.
9. N-carbethoxy-1-methyl-dihydro-D-lysergamine I.
10. N - propyl - carboxy - 1 - methyl - dihydro - D-lysergamine I.
11. N - isobutyl - carboxy - 1 - methyl - dihydro - D-lysergamine I.
12. N - isopropyl - carboxy - 1 - methyl - dihydro - D-lysergamine I.
13. N-nicotinyl-1-methyl-dihydro-D-lysergamine I.
14. N-isonicotinyl-1-methyl-dihydro-D-lysergamine I.
15. 1-methyl-N-carbobenzoxy-dihydro-D-lysergamine I and its non-toxic pharmaceutically acceptable acid addition salts.

No references cited.

NICHOLAS S. RIZZO, *Primary Examiner.*